United States Patent

Takahashi

[15] 3,697,087

[45] Oct. 10, 1972

[54] AUTOMATIC RECORD PLAYER

[72] Inventor: Yoshio Takahashi, Yokohama-shi, Japan

[73] Assignee: Pioneer Electronic Corporation, Tokyo, Japan

[22] Filed: Nov. 12, 1969

[21] Appl. No.: 875,683

[30] Foreign Application Priority Data

Nov. 13, 1968 Japan ......................43/82540
July 3, 1969 Japan ......................44/52588

[52] U.S. Cl. ..............................274/23 R, 274/10 R
[51] Int. Cl. ..........................G11b 3/10, G11b 17/08
[58] Field of Search ...........................274/10 R, 23 R

[56] References Cited

UNITED STATES PATENTS

| | | | |
|---|---|---|---|
| 3,305,238 | 2/1967 | Carlson | 274/23 R |
| 3,254,896 | 6/1966 | Dennis | 274/10 R |
| 3,285,611 | 11/1966 | Freathy | 274/10 R |
| 3,197,212 | 7/1965 | DeWeese | 274/10 R |
| 3,305,239 | 2/1967 | Hathaway | 274/10 R |
| 3,091,468 | 5/1963 | Sperber | 274/10 R |
| 3,083,971 | 4/1963 | Andres | 274/23 R |

*Primary Examiner*—William D. Martin, Jr.
*Assistant Examiner*—Steven L. Stephan
*Attorney*—Sughrue, Rothwell, Mion, Zinn & Macpeak

[57] ABSTRACT

An automatic record player controlling automatically a tone arm to reproduce a record disk which can be of various diameters. The tone arm is moved from an arm rest onto a record to reproduce the record and is returned from the record to the arm rest when the record is reproduced either completely or only half-way. The tone arm of the automatic record player can also be controlled manually.

7 Claims, 30 Drawing Figures

AUTOMATIC RECORD PLAYER

BACKGROUND OF THE INVENTION

1. Field of the Invention

This invention relates to a record player which includes a turntable and a tone arm which supports a pick up device, and more particularly to an automatic control apparatus for the record player which operates to move the tone arm from an arm rest to a record and to return it from the record to the arm rest and which permits a tone arm to be controlled manually.

2. Brief Description of the Prior Art

In automatic record players, generally a control apparatus is very complex and is very difficult to move a tone arm to an appointed position. As a result, the tone arm is miscontrolled occasionally.

SUMMARY OF THE INVENTION

An object of this invention is to provide an improved automatic record player which moves a tone arm accurately when the record player begins to reproduce a record which is selected in records of different diameters and completes or stops halfway to playback a record.

Another object of this invention is to provide a new control apparatus to turn the tone arm safely and accurately from an arm rest onto an outside non-recorded groove of a record and to return from a record to an arm rest.

A further object of this invention is to provide a new control apparatus which is able to adjust easily and delicately the appointed position where the tone arm moved onto a record.

A still further object of this invention is to provide the tone arm of this automatic record player which is, if necessary, operated manually.

In the automatic record player of this invention, a tone arm is mounted on the end of a tone arm shaft and a fine adjustment device is mounted on the other end of the tone arm shaft. A moving plate which is driven reciprocatively by a sub-motor, a turning plate and a stopper plate are pivoted on a shaft. When the moving plate is driven, the turning plate interlocks with the moving plate until the turning plate comes into contact with the stopper plate.

At the beginning of reproduction, the moving plate and the turning plate are turned. The turning plate holds a fine adjustment device connected with the tone arm shaft and turns the tone arm from an arm rest toward the turntable. The tone arm is stopped above an outside non-recorded groove on the record, that is, at the position where the turning plate comes into contact with the stopping plate, and then it comes down slowly on the record.

As a record is reproduced to the end or is stopped half-way through a recording, a returning plate which interlocks with the moving plate returns the tone arm to the arm rest.

When the tone arm is controlled manually in the same way as a general record player, the tone arm is not moved from the arm rest by this control mechanism because the turning plate is stopped by the stopping plate while the moving plate is moved. Thus, the tone arm can be moved manually onto any part of the record.

BRIEF DESCRIPTION OF THE DRAWING

FIG. 1 is a plan view of a record player embodying the invention with part of the turntable sectioned and a tone arm turned to the turntable;

FIG. 2 is a side sectional view of the record player taken on section line II—II of FIG. 1;

FIG. 3 is a front sectional view of the record player when the tone arm is on an arm rest;

FIG. 4 is a plan view showing the control apparatus, when the tone arm is on the arm rest;

FIG. 5 is a plan view showing the control apparatus, when the tone arm is turned to a record FIG. 6 is a plan view of the tone arm and sensing mechanism;

FIG. 7 is a plan view of the moving device;

FIG. 8 is a plan view of the turning device;

FIG. 9 is a plan view of the stopping device;

FIG. 10 is a plan view of the operating lever;

FIG. 11 is a plan view of the switching lever and springs;

FIG. 12 is a front view of the control driving means;

FIG. 13 is a rear view of a rotating plate;

FIG. 14 is a plan view of a printed circuit board;

FIG. 15 is a schematic circuit diagram showing the power connections to a phonomotor and submotor;

FIG. 16 is a schematic circuit diagram showing a reproduction of a record;

FIG. 17 is a front view of a part of the second embodiment of the invention;

FIG. 18 is a plan view of the control mechanism when the arm is on an arm rest;

FIG. 19 is a plan view of the control apparatus when the tone arm is turned to a record;

FIG. 20 is a front view of a part of a third embodiment of the invention;

FIG. 21 is a plan view of a control apparatus when the arm is on an arm rest;

FIG. 22 is a plan view of a control apparatus when the tone arm is turned to a record;

FIG. 23 is a plan view of a control apparatus when the tone arm is turned manually;

FIG. 24 is a side view of a part of a fourth embodiment of the invention;

FIG. 25 is a plan view of a control apparatus when the tone arm is on an arm rest;

FIG. 26 is a plan view of a control apparatus when the tone arm is turned to a record;

FIG. 27 is a plan view of a moving device;

FIG. 28 is a front view of the moving device;

FIG. 29 is a side view of a hair spring on the moving device; and

FIG. 30 is a plan view of a turning device and a stopping device.

DESCRIPTION OF THE PREFERRED EMBODIMENT

Figure 3:
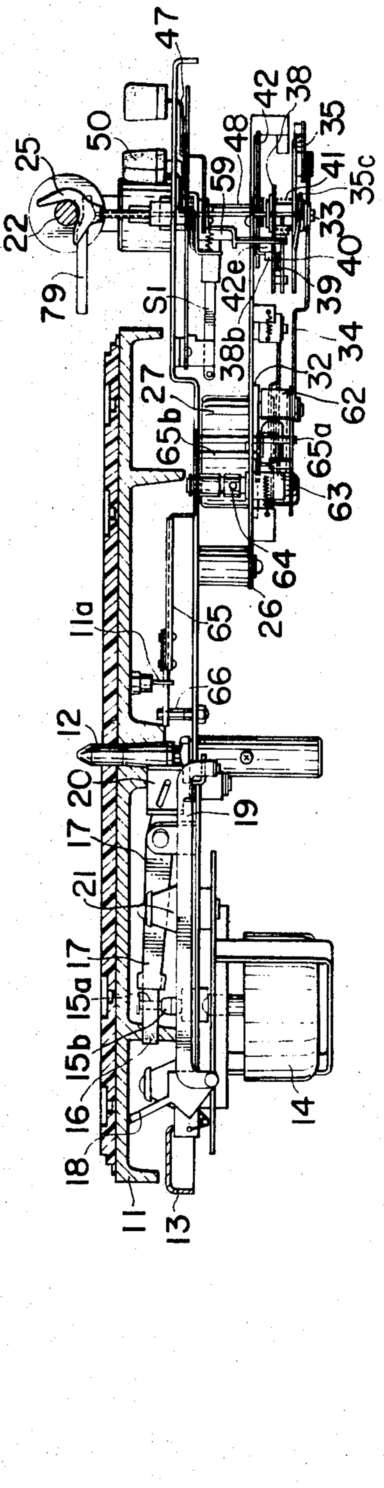

In the drawings, a turntable 11 is rotated by a shaft 12 mounted on a board or platform 13. Referring to FIG. 3, a driving belt pulley 15 which has a smaller belt pulley portion 15*a* and a larger belt pulley portion 15*b* is mounted on a shaft of a rotator of a phonomotor 14. The turntable 11 and the driving belt pulley 15 are connected by a driving belt 16. The driving belt 16 is shifted on either the smaller belt pulley portion 15*a* to drive a turntable 11, 33 r.p.m. or the larger belt pulley portion 15*b* to drive the turntable 11 45 r.p.m. by a shifting lever 17. The shifting lever 17 is turned by a lever 18 connected with a rod 19 and a cam lever 20. The phonomotor 14 driving the turntable 11 is mounted on the board 13 by rubber cushions 21 to absorb the vibration of itself. A tone arm 22 is mounted on an end of a tone arm shaft 23. A pick-up 24 is mounted on the end of tone arm 22 to trace the groove of a record. Tone arm 22 is on an arm rest 25 while the automatic record player is in OFF state.

A sub-board 26 fixed beneath the board 13 mounts a control mechanism and a sensing mechanism. A sub-motor 27 which drives the control mechanism is a geared motor and rotates about 4 r.p.m. Sub-motor 27 is usually stopped after rotating an angle of 180°. A rotating plate 29 having an electric conductor 30 and a pin 31 is fixed on the shaft 28 of the sub-motor 27.

Figures 12, 13, 15:
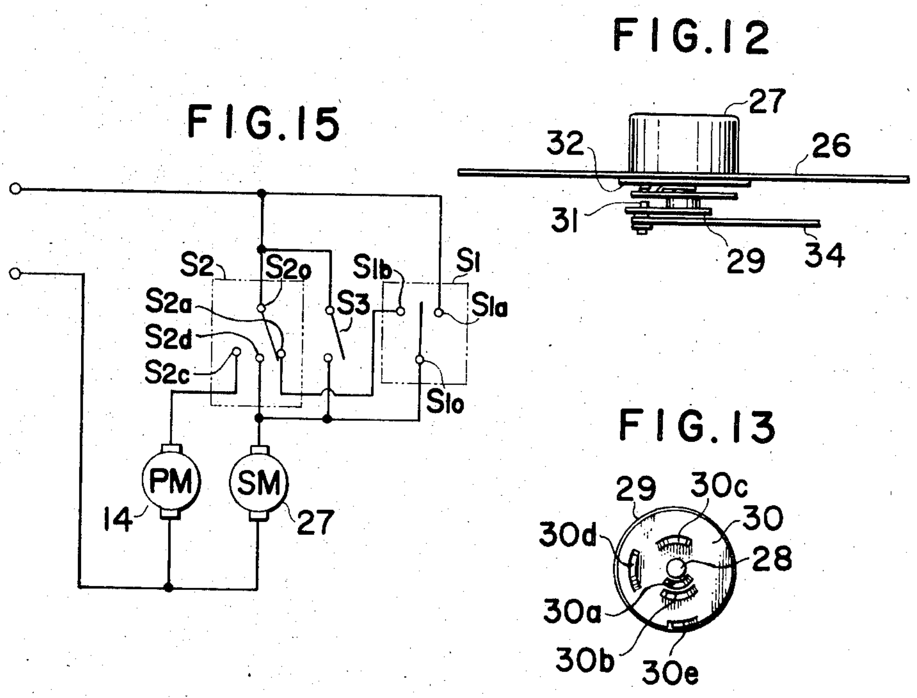
Figure 14:
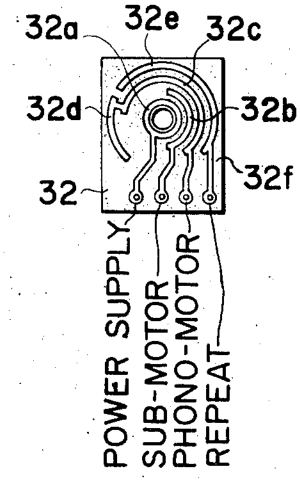

Electric conductor 30 has five terminals 30*a*, 30*b*, 30*c*, 30*d* and 30*e* shown in FIG. 13. A printed circuit board 32 best seen in FIG. 14 is composed of a dielectric portion 32*f* and five printed circuitries 32*a*, 32*b*, 32*c*, 32*d* and 32*e*. These printed circuitries confront electric conductor 30. The circular printed circuitry 32a is connected with an electric source.

The curvature of printed circuitry 32*b* is smaller than the curvature of circular printed circuitry 32*a* and printed circuitry 32*b* is connected with the terminal S2*b* to provide electric current to sub-motor 27. The curvature of printed circuitry 32*c* is smaller than the curvature of printed circuitry 32*b* and is connected with printed circuitry 32*d*.

Printed circuitry 32*d* is the smallest curvature and is connected with the terminal S2*c* to provide electric current to phonomotor 14. Printed circuitry 32*e* has the same curvature with printed circuitry 32*d* but they are insulated from each other. Printed circuitry 32*e* to continuously reproduce a record is connected with the terminal S2*a*.

Terminal 30*a* of electric conductor 30 contacts circular printed circuitry 32*a*. Terminals 30*b* and 30*c* are placed opposite to electric conductor 30. Terminal 30*b* or 30*c* contacts with electric conductor 32*b* when the tone arm 22 is moved from arm rest 25 onto a record or is returned from a record onto arm rest 25. Terminal 30*d* is connected with the electric conductor 32*c* when the record is reproduced. Terminal 30*e* can be connected with circular electric conductor 32*d* or 32*e*. Switch S2 is composed of electric conductor 30 having terminals 30*a*, 30*b*, 30*c*, 30*d* and 30*e* and circular conductors 32*a*, 32*b*, 32*c*, 32*d* and 32*e*.

A shaft 33 pivots a moving plate 35, a turning plate 38 and a stopping plate 42. MOving plate 35 is connected with rotating plate 29 by a connecting rod 34. As sub-motor 27 makes one cycle of rotation, turning plate 35 is reciprocated to move tone arm 22 from arm rest 25 onto the record and from the record to arm rest 25. The moving plate 35 pivots a return arm 36 which is turned either to the right or left. A coil spring 37 connects moving plate 35 with returning arm 36 and biases returning arm 36 to the right or left. Moving plate 35 is composed of a cut portion 35*a* which limits returning arm 36 in its turn, a higher cam portion 35*b*, a lower cam portion 35*c* and a pin 35*d*. The turning plate 38 pivots a holding arm 39 and has stoppers 38*a* and 38*b*. Holding arm 39 which is composed of hooked portion 39*a* and legs 39*b* and 39*c* are added always to the turning force shown by arrow A by a coil spring 40. A compression spring 41, which is coiled around shaft 33, is placed between moving plate 35 and turning plate 38. Thus, turning plate 38 cooperates with moving plate 35 and is stopped by a stopping plate 42 in spite of the operation of moving plate 35. Stopping plate 42 having notches 42*a*, 42*b*, 42*c* and 42*d* and a hook 42*e* is operated by a lever 47. One of the four notches is clutched by a leaf spring 43. Reproducing a record which has 25 cm or 17 cm diameter, notch 42*b* or notch 42*c* has to be clutched.

When tone arm 22 is operated manually, notch 42*d* has to be clutched. Stopping plate 42 is connected with lever 47 which is pivoted on shaft 49 by a rod 48. A pin 44 on sub-board 26 stops the rotation of holding arm 39. A stopper 46 on sub-board 26 returns returning arm 36 counterclockwise when returning arm 36 is turned clockwise. A starting lever 50 having pits 50*a* and 50*b* and slope 50*c* is pivoted by shaft 49. A slide lever 51, having a pin 52 and an oblong hole 51*a* is slidably held on the shaft 49. A pin 53 of the board 54 is inserted in oblong hole 51*a*.

Slide lever 51 is slid in a direction of an elongated line drawn between shaft 49 and pin 53. Slide lever 51 and shaft 49 are connected by a tension spring 55 to each other. Pin 52 of slide lever 51 is usually in pit 50*a* of starting lever 50. When starting lever 50 is turned counterclockwise, a switch S1 makes its contact S1a. At this time, pin 52 is on slope 50*c* of starting lever 50, and thus the starting lever 50 is returned to pit 50*a* by tension spring 55. When starting lever 50 is turned clockwise, the switch S1 makes its contact S1*b*, and pin 52 of slide lever 51 is entered and is held in pit 50*b* of starting lever 50.

A free arm 56 and a fixed arm 59 are supported on the other end of tone arm shaft 23 which is extended beneath board 13. Free arm 56, which is pivoted freely on tone arm shaft 23, has a slope 56*a* and a spindle 57. Fixed arm 59, which is fixed on tone arm shaft 23, has a screw 60 which contacts slope 56*a* of free arm 56 and has a sensing screw 61 which operates the sensing mechanism. Free arm 56 and fixed arm 59 are connected by a spring 58 to each other to contact the slope 56*a* of the free arm 56 with the screw 60 of the fixed arm 59. As the screw 60 of the fixed arm 54 is threaded in, the relative angle between free arm 56 and fixed arm 59 is made large. So that tone arm 22 is adjusted to come down correctly on the outside non-recorded groove of a record. When spindle 57 of free arm 56 is turned, tone arm 22 is turned with the spindle 57.

An action lever 62 having a projection 62*e* and hook portions 62*b* and 62*c* are held by a rotatable shaft 63. Action lever 62 is moved by fixed arm 59 in accordance with the rotation of tone arm 22. The shaft 63 supports a sleeve 64 and a sensing lever 65 having pins 65*a* and 65*b*. The sensing lever 65 is on sleeve 64 and can be rotated freely around the shaft 63. The top of sensing lever 65 is cut about a tangential line of the orbit of traveling pin 11*a* which is extended down from the turn table. A stopper pin 66 of the sub-board 26 limits the rotation of sensing lever 65. A hair spring 67 of the sub-board 26 limits the rotation of the action lever 51 until the record is reproduced completely. The sensing lever 65 is pivoted freely on the sleeve 64 and is rotated with the action lever 62 by the frictional force between sensing lever 65 and sleeve 64 while the rotation of sensing lever 65 is not interfered with.

An operating lever 68 comprising arm portions 68*a*, 68*b*, and 68*c* is pivoted by a shaft 69 and is added to the turning force by a spring 70. And shaft 69 pivots springs 72 and 73 and a switch lever 71 having hooks 71*a*, 71*b*. Spring 72 is very stronger than spring 73. Arm portion 68*a* or 68*b* of the operating lever 68 is touched by the pin 31 of rotating plate 29 or a pin 74 of sub-board 26 by spring 70. While arm portion 68*b* of operating lever 68 contacts pin 74, a switch S4 is closed by portion 68*c* of operating lever 68. When this automatic record player is not reproducing a record (hereinafter referred to as "OFF state"), the top of the stronger spring 72 is kept into contact with the pin 31 of rotating plate 29 by spring 73. When the automatic record player is reproducing a record (hereinafter referred to as "ON state"), stronger spring 72 is kept in contact with shaft 29*a* of rotating plate 29. A fork lever 75 having legs 75*a* and 75*b* is pivoted by a shaft 76. The side of the nail of leg 75*a* is contacted with hook 71*a* by a spring 77. In the OFF state, the end of spring 72 contacts with pin 31 of rotating plate 29 and the other end of spring 72 contacts with hook portion 62*c*, so action lever 62 is limited in its rotation. The operating lever 68 is in contact with pin 74 and pin 65*a*, so sensing lever 65 is limited to rotate. The top of sensing lever 65 cannot enter into the orbit of traveling pin 11*a*. An elevation pin 78 having a holder 79 is on higher cam portion 35*b* or on lower cam portion 35*c* of turning plate 35. When elevation pin 78 is on higher cam portion 35*b* in the OFF state, tone arm 22 is on the arm rest 25. When elevation pin 78 is shifted on lower cam portion 35*c*, pick-up 24 of tone arm 22 slowly comes down on the record.

Figure 16:
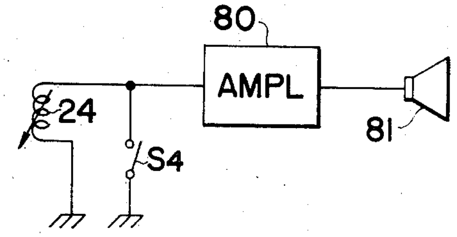

In the amplitude circuit for reproducing a record shown in FIG. 16, a pick-up 24, an amplifier 80 and loud speaker are connected in parallel. As switch S4 makes contact, amplifier 80 is not fed signals from pick-up 24. Thus, only while tone arm 22 is on a record, is the switch S4 opened.

Figure 1:
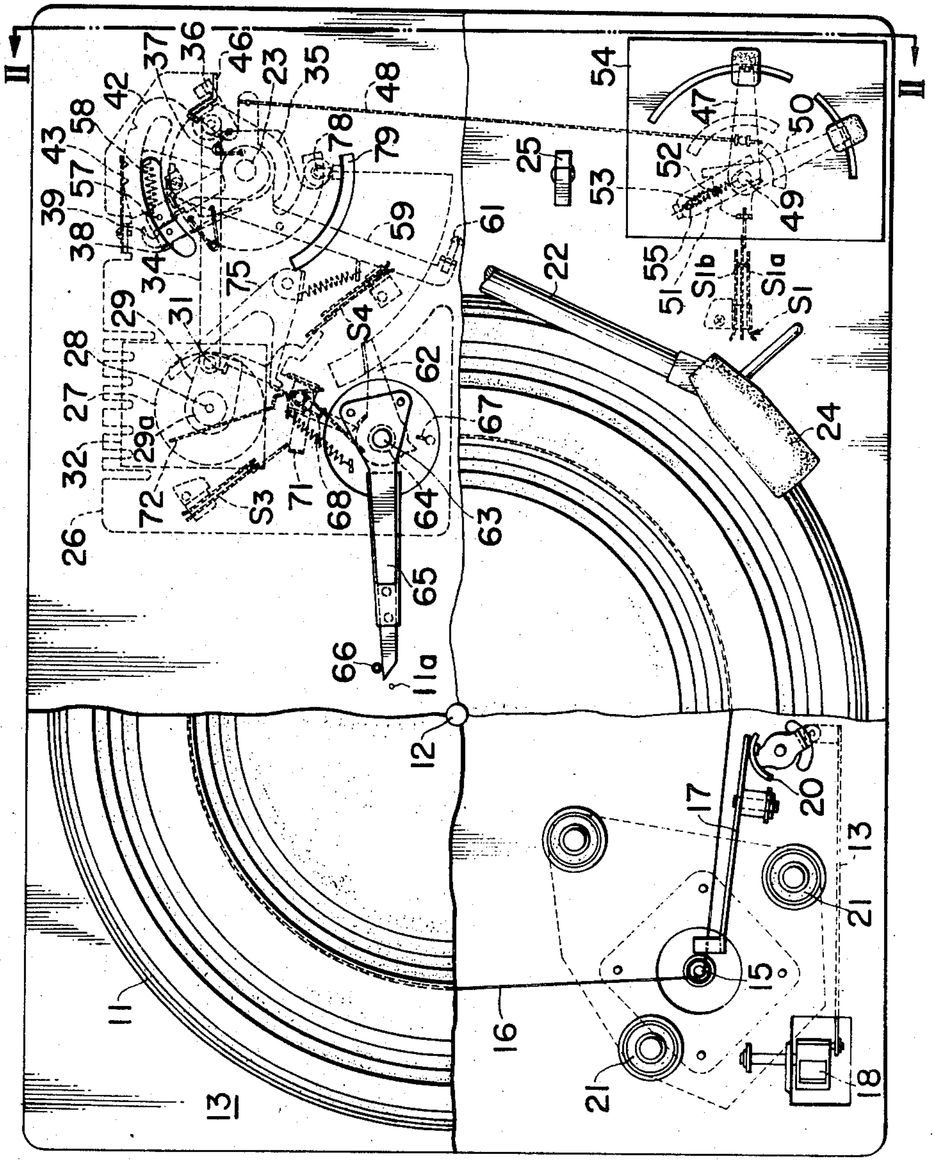
FIGS. 1 to 16 relate to the first embodiment of this invention.
Figure 2:
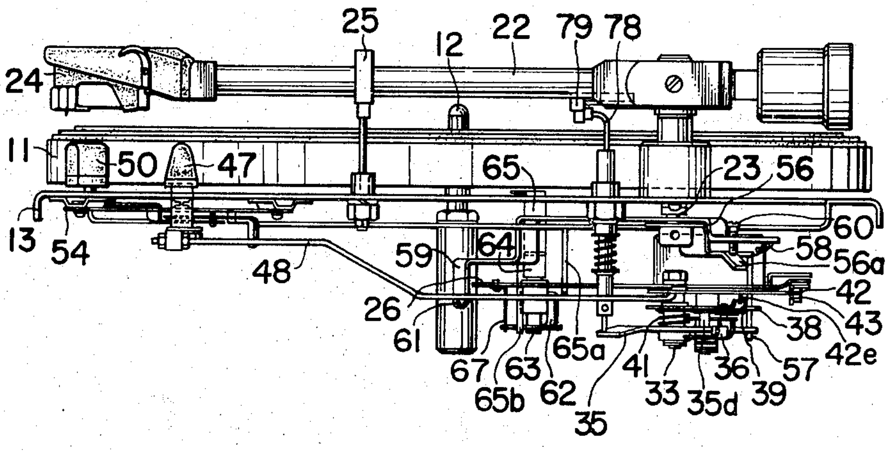
Figure 4:
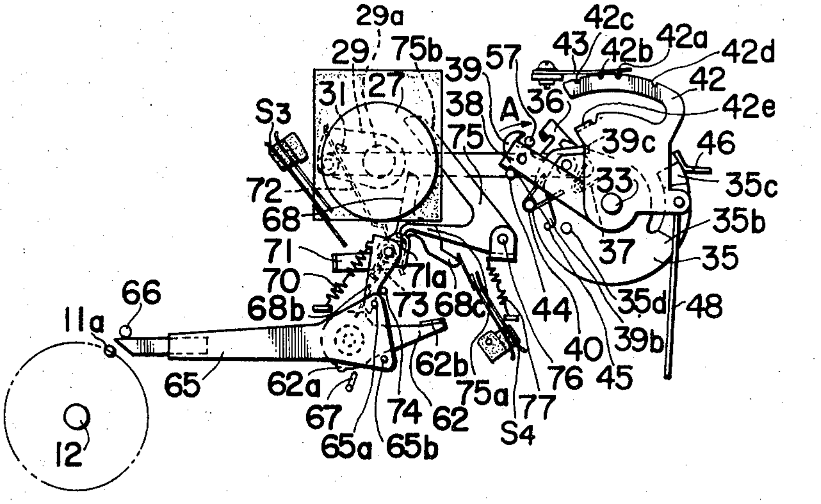

The first embodiment of this invention operates as follows:

In FIG. 4, this record player is in the OFF state. One of the records of different diameter is set on the turntable 11. For example, the diameter of the record is 30 cm and the reproducing speed of the record is 33 r.p.m. Driving belt 16 is shifted on smaller belt pulley 15*a* by lever 18. Notch 42*a* of stopping plate 42 is clutched with the leaf spring 43 by lever 47. Starting lever 50 is turned counterclockwise to make the contact S1a of switch S1. Sub-motor 26 begins to operate and goes on while contact 30*b* of electric conductor 30 is on printed circuitry 32*b*. As soon as sub-motor 26 begins to operate, leg 39*b* of holding arm 39 is freed from a pin 45 of sub-board 26, and hooked portion 39*a* of holding arm 39 holds spindle 57 of free arm 56. Turning plate 38 is turned with the moving plate 35 to the right. Phonomotor 14 begins to operate soon after the starting of motor 27. Tone arm 22 is moved from arm rest 25 to the direction of the record. When turning plate 38 comes in contact with stopping plate 42, tone arm 22 has arrived above the outside non-recorded groove of the record and is stopped.

As sub-motor 27 turns, spring 72 is shifted from pin 31 of rotating plate 29 to shaft 29*a*, permitting spring 72 to free action lever 68. Operating lever 68, of which arm portion 68a contacts pin 74, is turned clockwise by pin 31 and the arm portion 68a is removed from pin 74, thus operating lever 68 frees sensing lever 65.

Also sub-motor 27 is turning, pin 35*d* of moving plate 35 comes into contact with leg 39*b* of holding arm 39 and rotates holding arm 39 which holds spindle 57 of free arm 26 interlocking with tone arm 22. Free arm 56, interlocking with tone arm 22, is freed from holding arm 39. As the elevation pin 78 is shifted from a higher cam portion 35*b* to a lower cam portion 35*c* of turning plate 35, pick-up 24 of tone arm 22 accurately comes down on the outside of the non-recorded groove of the record.

After turning an angle of 180°, sub-motor 27 is stopped because contact 30*b* is removed from printed circuitry 32*b*, so that switch S1 makes only its contact S2*c*. Now the record begins to reproduce.

Accordingly, as the record is reproduced by pick-up 24, tone arm 22 turns around slowly toward the center of turntable 11. Action lever 62 is rotated slowly by sensing screw 61 of fixed arm 59 interlocking with tone arm 22. Sensing lever 65 on the sleeve 64 of the shaft 63 is turned with action lever 62 and the turning angle of sensing lever 65, according to one rotation of the record, is very small. So, sensing lever 65 is snapped out by traveling pin 11*b* and is prevented from entering the orbit of traveling pin 11*b*. Though action lever 62 has been turning, sensing lever 65 is slid on the sleeve 64 and is nearly stopped at the tangent of the orbit of traveling pin 11*b*.

Figures 5, 6:
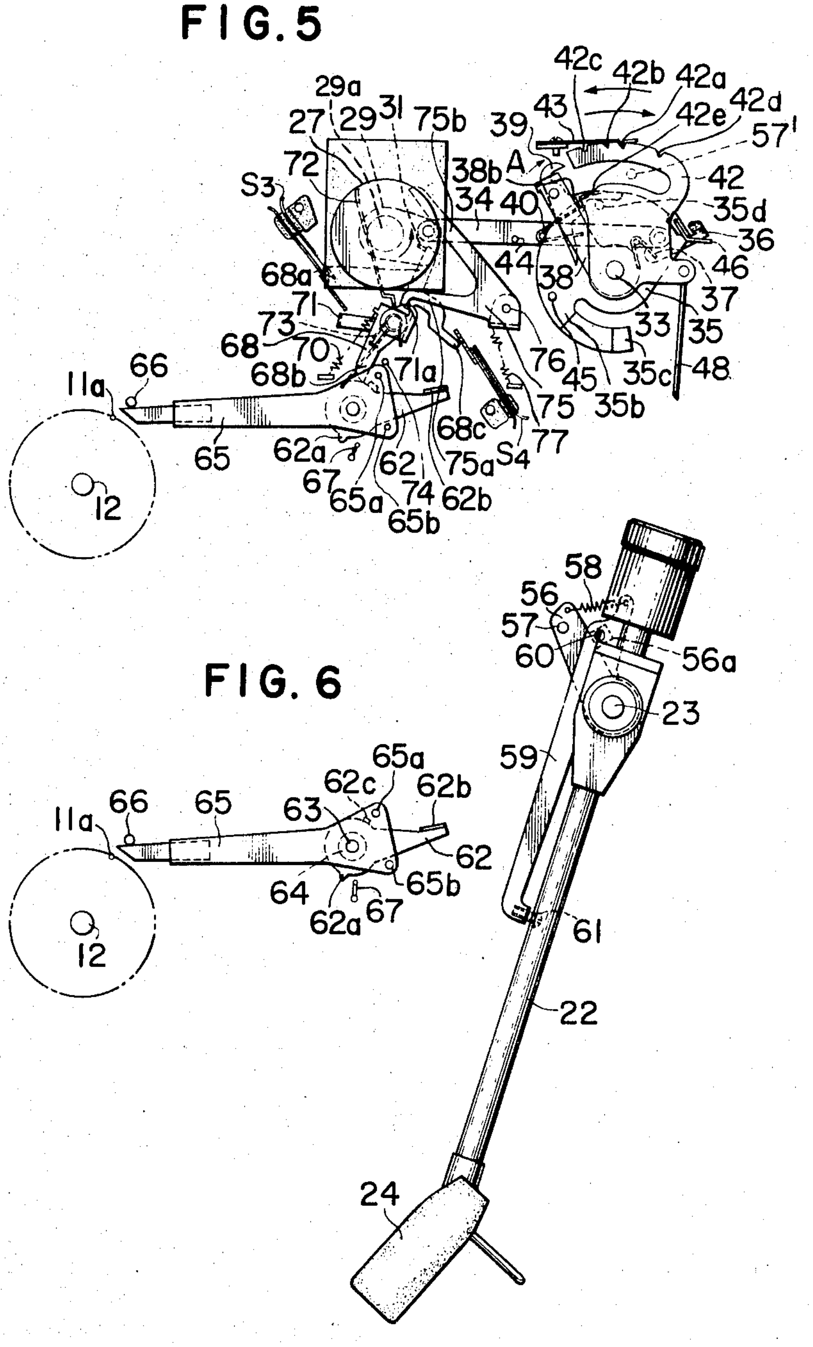
Figure 7:
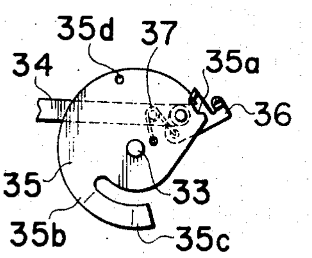
Figure 8:
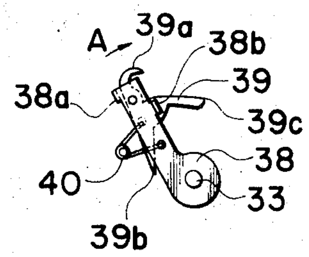
Figure 9:
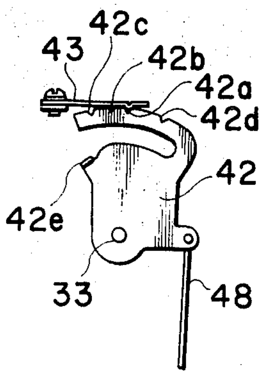
Figure 10:
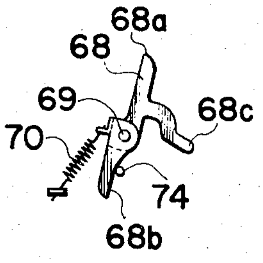
Figure 11:
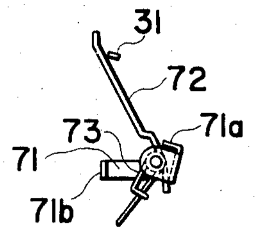

When the record is reproduced completely, pick-up 24 is moved in the inside non-recorded groove of the record and tone arm 22 is turned rapidly toward the center of turn table 11. At the same time the top of sensing lever enters the orbit of traveling pin 11b, and sensing lever 65 is rotated quickly by traveling pin 11b. Pin 65*b* of sensing lever 65 turns operating lever 68 and switch lever 71 As soon as sensing lever 65 is released from traveling pin 11*b*, sensing lever 65 and operating lever 68 are returned to the position shown as FIG. 5 by the spring 70.

When switch lever 71 is turned by pin 65*b*, hook 71*a* of switch lever 71 is clutched with the nail of fork lever 75, and the switch lever 71 is held. Switch S3 is maintained closed by hook 71*a* of switch lever 71. So, sub-motor 27 begins to turn again. As soon as sub-motor rotates a little, contact 30*c* of electric conductor 30 is turned onto printed circuitry 32*b*. As sub-motor 27 continues, operating lever 68 leaves pin 31 of the rotating plate 29 and fork lever 75 is turned by pin 31. Switch lever 71 is freed from the nail of fork lever 75 and switch S3 is opened. So, moving plate 35 and turning plate 38 are returned by sub-motor 27. As elevation pin 78 is shifted from lower cam portion 35*c* to higher cam portion 35*b* of moving plate 35 by the turn of moving plate 35, tone arm 22 is lifted up from the record.

And tone arm 22 is returned to the arm rest 25 by returning arm 36 pivoted on moving plate 35. Turning plate 38 begins to turn with moving table 35 and is stopped by pin 44. After rotating plate 29 is turned an angle of 180°, the control mechanism is returned to the beginning situation, that is, OFF state.

When the record is stopped halfway in its reproduction, the contact S1*a* of switch S1 is closed by starting lever 50. Thus, sub-motor 26 begins to turn again. Tone arm 22 is lifted up from the record and is returned to arm rest 25 by the operation abovementioned.

Hereinafter, the operation of the repeat-production of the same record is described briefly.

According to a reproducing speed and a diameter of a record, shifting lever 17 and lever 47 are set manually. Starting lever 50 is turned to the right, and is locked by pin 52 of slide lever 51. The record player operates as above-mentioned. That is, the tone arm 22 is moved from the arm rest onto the record and the record is reproduced.

After the reproduction of the record is over, the tone arm 22 is returned from the record onto the arm rest, but contact S1*b* of switch S1 is closed. Therefore, the tone arm 22 is turned to the record again.

In cases where the tone arm 22 is manually operated, notch 42*d* of stopping plate 42 is locked by leaf spring 43. Hook 42*e* of stopping plate 42 is almost in contact with stopper 38*a* of turning plate 38. As contact S1a of switch S1 is closed, sub-motor 27 begins to operate. Though the moving plate 35 is turned, turning plate 38 is stopped by stopping plate 42. When sub-motor 27 rotates an angle of 180°, tone arm 22 is free on arm rest 25. Thus, tone arm 22 can be moved manually to anyplace on the record.

When tone arm 22 is moved manually to an upper position on a record before switch S1 is closed, returning arm 36, which is pivoted on moving plate 35, is turned clockwise and comes into contact with the right side of cut portion 35*a* of turning plate 35 and then is kept in this situation by spring 37. Switch S1 makes its contact S1*a* and the moving plate is turned to the right. Returning arm 36 is turned to the left by stopper 46 just before sub-motor 22 rotates at an angle of 180°.

After the reproduction of the record is over, tone arm 22 is returned to arm rest 25 as set forth above.

The second embodiment of the present invention will now be described in detail.

Figure 17:
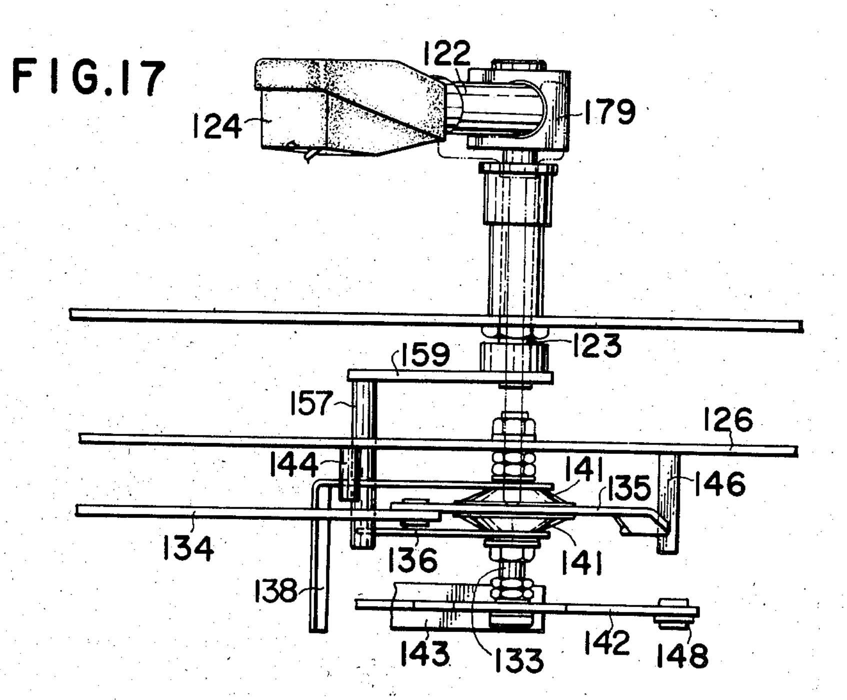
FIGS. 17 to 19 relate to the second embodiment of this invention.
Figure 19:
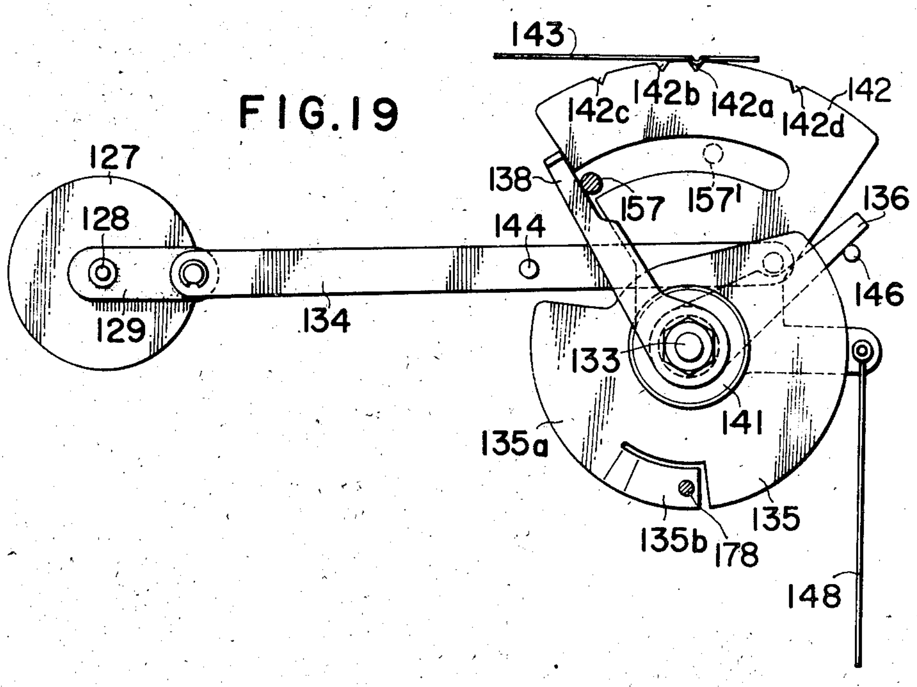
Figure 18:
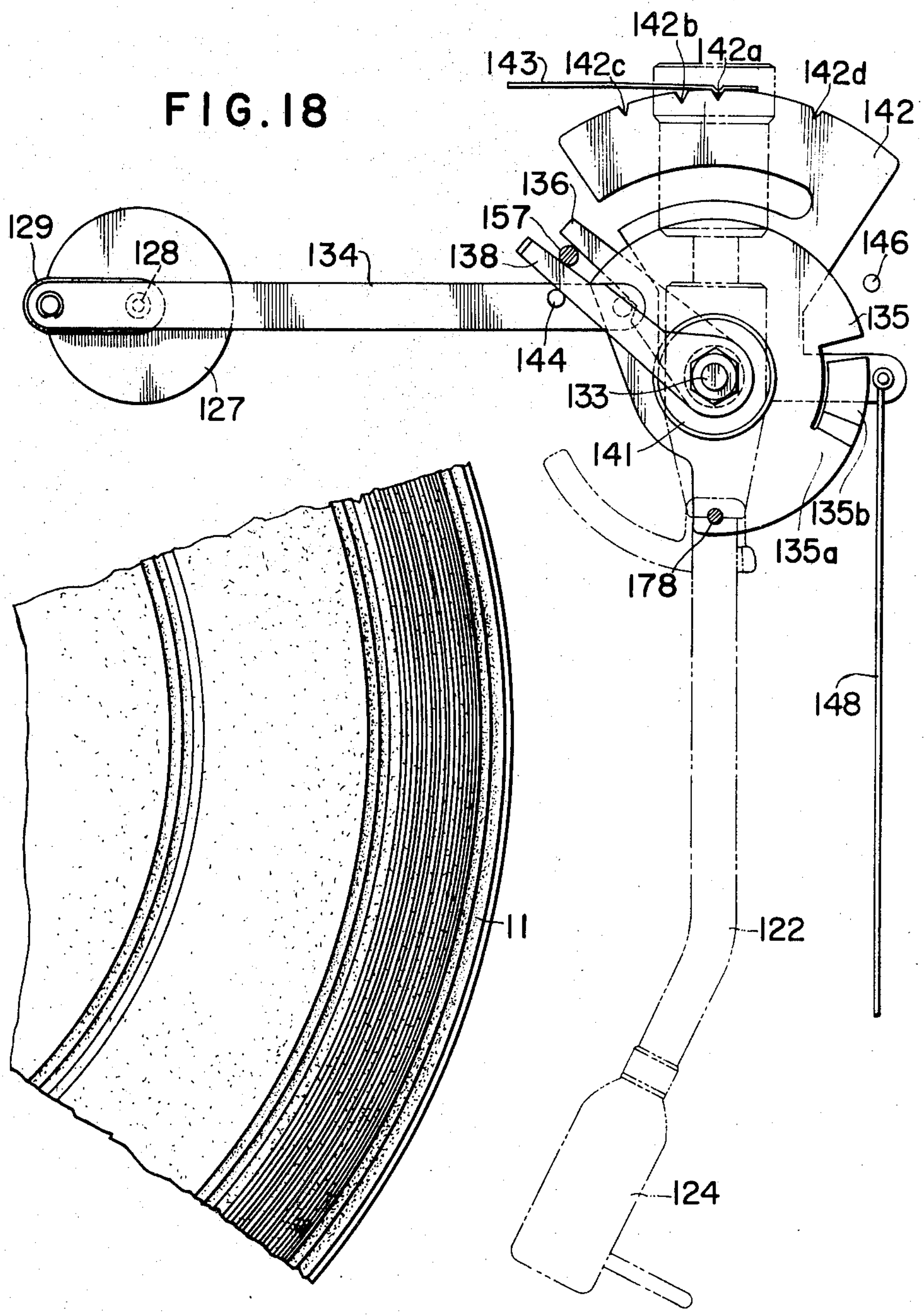
Figure 20:
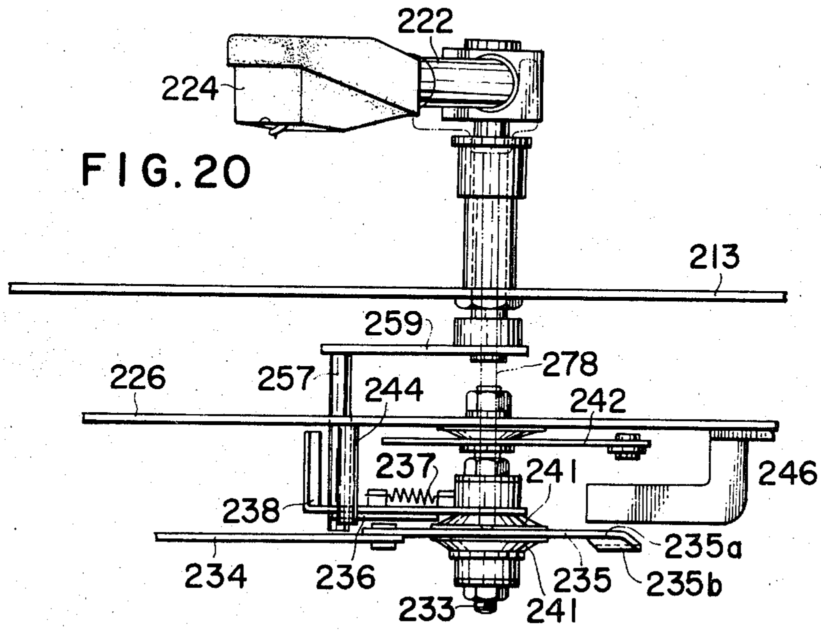
FIGS. 20 to 23 relate to third embodiment of this invention.
Figure 22:
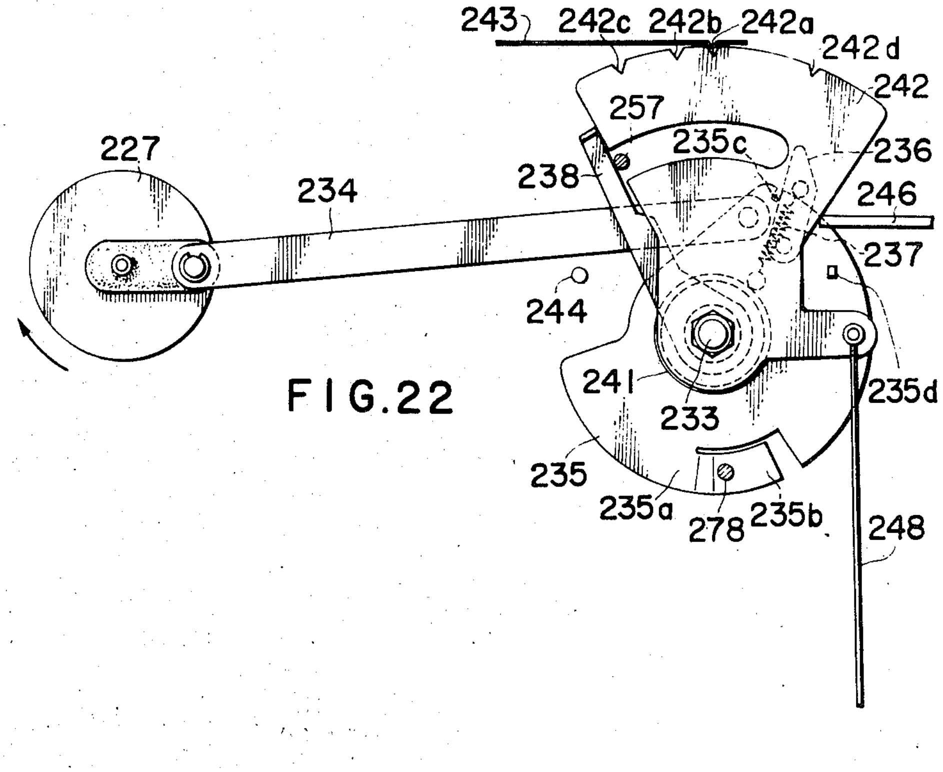
Figure 21:
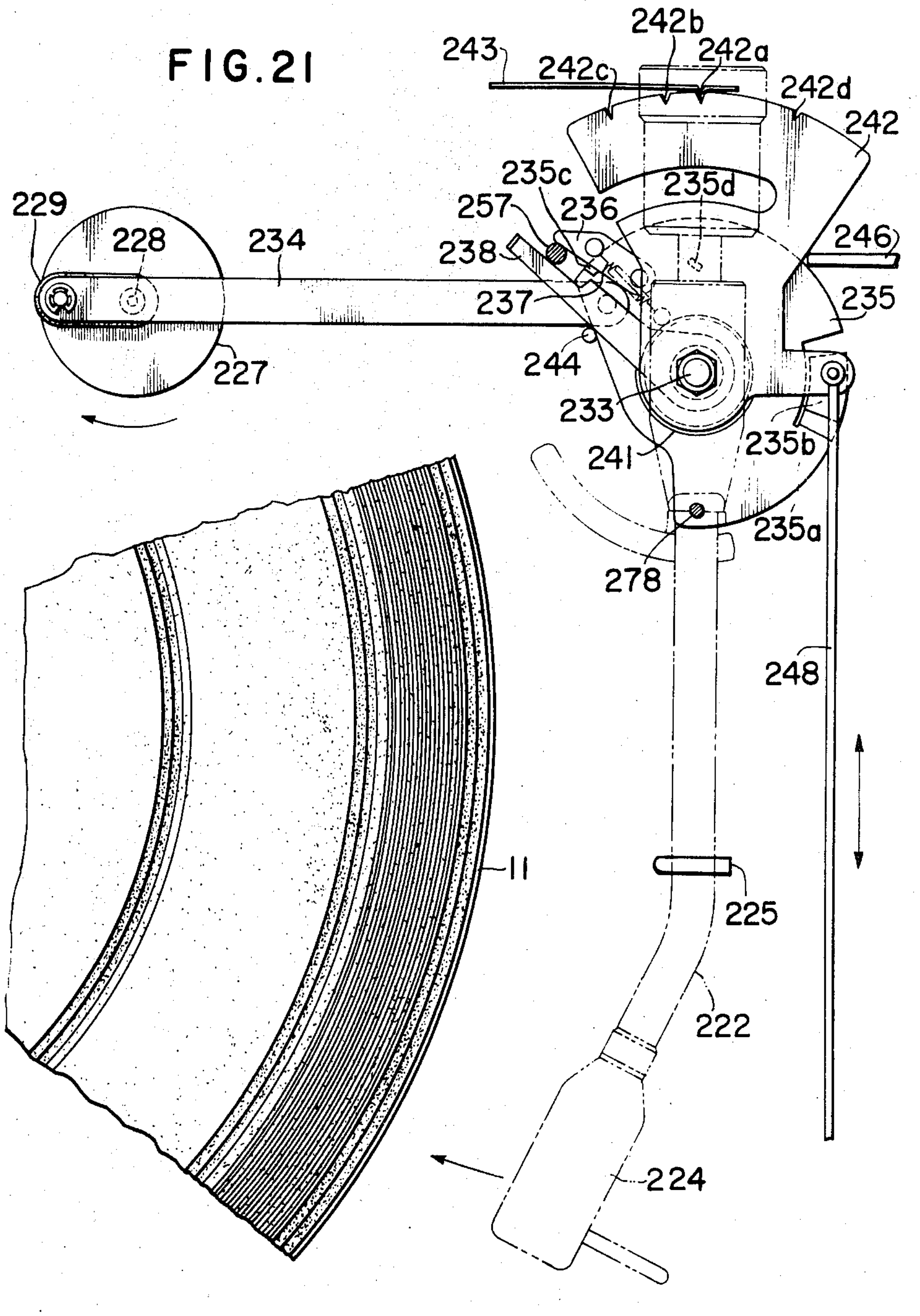
Figures 23, 24:
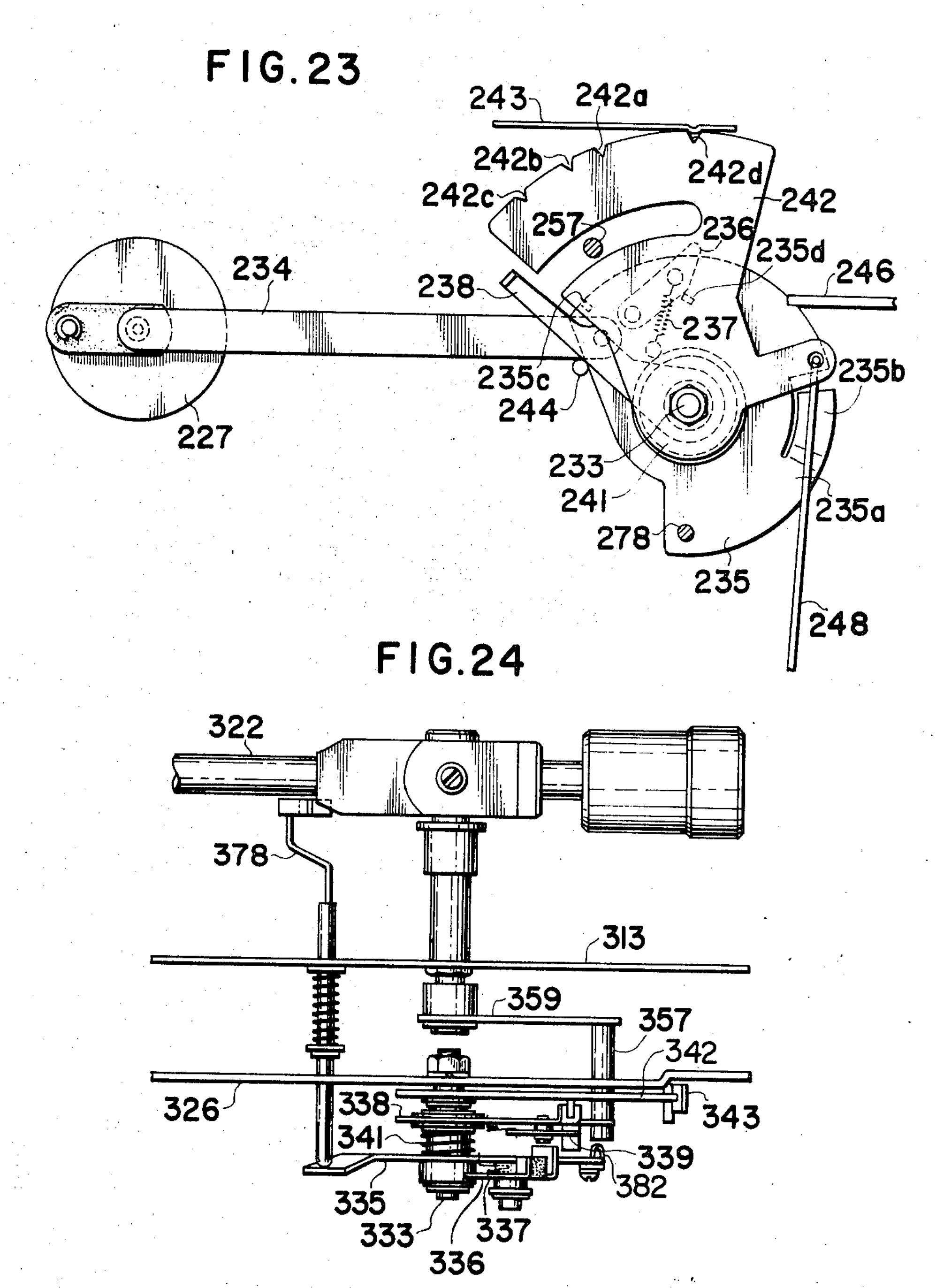
FIGS. 24 to 30 relate to the fourth embodiment of this invention.

Referring to FIGS. 17 through 19, a moving plate 135 having a higher cam portion 135a and a lower cam portion 135*b* is pivoted on a shaft 133. The moving plate 135 is connected with a sub-motor 127 by a connecting rod 134 and is reciprocated by said sub-motor 127. Shaft 133 pivots a turning plate 138, a returning arm 136, and a stopper plate 142.

A compression spring 141 is placed between returning arm 136 and moving plate 135. A compression spring 141 is placed between moving plate 135 and turning plate 138. Returning arm 136 and turning plate 138 are turned with moving plate 135 when returning arm 136 and turning plate 138 are not prevented from turning. When returning cam 136 or turning plate 138 is prevented from turning, returning arm 136 or turning plate 138 is slid on moving plate 135. A stopping plate 142, which has notches 142*a*, 142*b*, 142*c* and 142*d* is turned by a lever (not shown). Stopping plate 142 is connected with the lever by a rod 148. Notches 142*a*, 142*b*, 142*c* and 142*d* of stopper plate 142 have the same object as the first embodiment, that is, limiting the turn of tone arm 122. An elevation pin 178 is on a higher cam portion 135*a* of moving plate 135 in the OFF state.

When a record which is 30 cm in diameter is reproduced, notch 142*a* of stopping plate 142 is clutched by a leaf spring 143. Moving plate 135 is turned by the sub-motor. Tone arm 122 is turned from an arm rest 125 to the record by a turning plate 138. When turning plate 138 comes into contact with stopping plate 142, the pick-up 124 of tone arm 122 is accurately moved to the upper position of the outside non-recorded groove of the record. Sub-motor 127 continues rotating, tone arm 122 slowly comes down on the record by elevation pin 178 which is shifted from the higher cam portion 135a to the lower cam portion 135*b*. Returning arm 136 is stopped by a stopper pin 146, and sub-motor 127 is stopped after rotating an angle of 180°. Now the record is reproduced.

When the record is reproduced completely, and the end of the reproduction is perceived as in the first embodiment and sub-motor 127 is begun to operate again, sub-motor 127 returns moving plate 135. Thus, returning arm 136 and turning plate 138 are returned with moving plate 135. Tone arm 122 is lifted up from the record by elevation pin 178 which is shifted from the lower cam portion 135*b* to higher cam portion 135a of moving plate 135. When the reproduction of the record is over, the spindle 157, which is interlocked with tone arm 122 is located at the point 157' shown as FIG. 19 and is returned by returning arm 136. So tone arm 122 is returned to the arm rest 125. Turning plate 138 is stopped by stopper pin 144 before tone arm 122 is returned to the arm rest 125. Sub-motor 127 is stopped in its operation after turning an angle of 180°.

In the case where the tone arm 122 is operated manually, notch 142*d* of stopper plate 142 is clutched by leaf spring 143. Thus, stopping plate 142 nearly contacts turning plate 138. When sub-motor 127 begins to operate, moving plate 135 and returning arm 136 are turned. But, turning plate 138 is stopped by stopping plate 142. Thus, tone arm 122 is not moved from the arm rest 125. After sub-motor 127 turns an angle of 180°, tone arm 122 can be freely operated manually and moved to some portion of the record.

When tone arm 122 is operated manually before sub-motor 127 stops operating, returning arm 136 is turned by spindle 157 which interlocks tone arm 122 and tone arm 122 is moved to some upper position on the record. When submotor 127 begins to turn, returning arm 136 is turned with moving plate 135, and soon, is stopped by pin 146, nevertheless, moving plate 135 is continuously turned and tone arm 122 slowly comes down on the record and the record is reproduced.

If the record is reproduced completely or is stopped halfway, the record player of this embodiment operates in the same way as the operation of the first embodiment and tone arm 122 is returned to arm rest 125 by returning arm 136.

The third embodiment of the present invention will now be described in detail.

Referring now to FIGS. 20 through 23, a submotor 227 and a moving plate 235 having a higher cam portion 235*a* and a lower cam portion 235*b* are joined by a connecting rod 234. Moving plate 235 pivots a returning arm 236 which is added to the force required to turn to the left or to right by a spring 237. Pins 235*c* and 235*d* of moving plate 235 limit to turn of returning arm 236. A shaft 233 pivots a turning plate 238, a stopping plate 242 and moving plate 235. As a compression spring 241 is placed between moving plate 235 and turning plate 238, turning plate 238 is turned with moving plate 235. The stopping plate 242 having notches 242*a*, 242*b*, 242*c* and 242*d* is connected with a lever (not shown) by a rod. Notches 242*a*, 242*b*, 242*c* and 242*d* are used in the same object as the first embodiment, that is, to limit turning of tone arm 222. An elevation pin 278 is on a higher cam portion 235*a* of moving plate 235 in OFF state.

When a record which is 30 cm in diameter is to be reproduced, notch 242*a* of stopping plate 242 is clutched by a leaf spring 243 and sub-motor 227 is begun to turn by closing of switch (S1). Moving plate 235 which is connected with the sub-motor 227 is turned. As turning plate 238 is turned with the moving plate 235, a spindle 257 on a free arm 256 which is jointed with tone arm 222 by a fixed arm 259 and a spring 258 is moved. Thus, tone arm 222 is turned from arm rest 225 to the record. Turning plate 238 is stopped at the place where the hook of turning plate 238 comes into contact with stopping plate 242, when tone arm 222 is accurately moved to upper position of the outside non-recorded groove of the record. As moving plate 235 continues to rotate, the elevation pin 278 is shifted from higher cam portion 235*b* to lower cam portion 235*a* of moving plate 235. Pick-up 224 supported on tone arm 222 comes down slowly on the outside non-recorded groove of the record. After rotating an angle of 180°, sub-motor 227 stops at the position shown in FIG. 22, and then the record is reproduced by pick-up 224.

When the record is reproduced completely, sub-motor 227 begins to operate again. As moving plate 235 returns, tone arm 222 is lifted up from the record by elevation pin 278. Tone arm 222 is returned to arm rest 225 by returning arm 236 which is pivoted on turning plate 238. Turning plate 238, which is returned with moving plate 235, is stopped by stopper pin 244 until tone arm 235 is returned on arm rest 225.

When tone arm 222 is operated manually, notch 242*d* of stopper plate 242 is clutched by leaf spring 243. Thus, the hook of turning plate 238 is nearly in contact with stopper plate 242. When sub-motor begins to operate, turning plate 238 is moved a little and tone arm 222 is not moved. After the sub-motor 227 is turned to an angle of 180°, tone arm 222 is freed and can be operated manually.

When tone arm 222 is operated manually, before sub-motor 227 begins to rotate, notch 242d of stopper plate 242 is clutched by leaf spring 243. Returning arm 236 is turned to the right by spindle 257 jointed with tone arm 222 shown as FIG. 21. After tone arm 222 is moved to the upper position somewhere on the record, sub-motor 227 begins to operate and pick-up 224 comes down slowly on the record. When moving plate 235 is almost turned, returning arm 236 is turned to the left by stopper pin 246 and the record is reproduced.

As the record is reproduced again or is stopped halfway, this record player operates as the same as the operation of the record player in the first embodiment and tone arm 222 is returned to arm rest 225 by returning arm 236.

The fourth embodiment of the present invention will now be described in detail.

Referring now to FIG. 24 through 30, a sub-motor 327 and a moving plate 335 are connected to each other by a connecting rod 334. The moving plate 335 has a higher cam portion 335a, a lower cam portion 335*b*, a cut portion 335*c*, and a hair spring 382 pivots a returning arm 336. Returning arm 336 is given a force turning to the left or right by a spring 337 and is limited to turn in its turning range by cut portion 335*c* of moving plate 335. A shart 333 pivots moving plate 335, a turning plate 338 and a stopping plate 342. A compression spring 341 is placed between moving plate 335 and turning plate 338 cooperating with moving plate 335 and turning plate 338. Turning plate 338, which has a hook 338*a* and a stopper 338*b*, pivots a holding arm 339. Holding arm 339 which is composed of an arm portion 339*a*, 339*b* and a hook of an arm portion 339*c* is turned to the left or right by a tension spring 340. The turning direction of the holding arm 339 is shifted by hair spring 382 of moving plate 335. An elevation pin 378 comes down or lifts up tone arm 322 when an elevation pin 378 is shifted on higher cam portion 335*a* or lower cam portion 335b or moving plate 335.

Figures 25, 26, 27, 28, 29, 30:
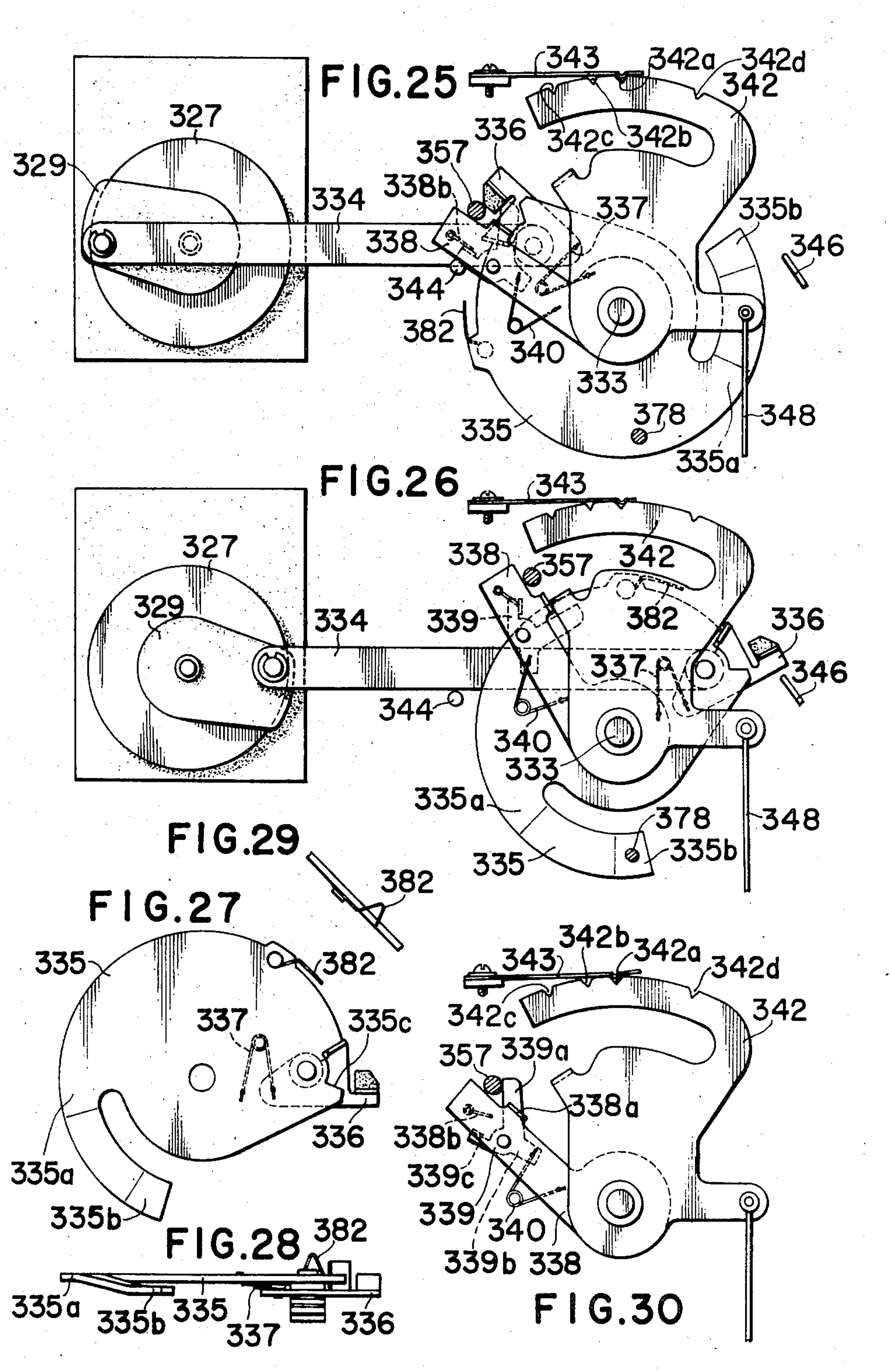

In FIG. 25, the record player is in the OFF state and tone arm 322 is on arm rest 325. When sub-motor 327 begins to operate, moving plate 335 is turned with turning plate 338. Soon after the turning of turning plate 338, arm portion 339*b* of holding arm 339 and moving plate 338 hold spindle 357 which is connected with tone arm 322 shown as FIG. 30. Turning plate 338 is turned to the position where the hook of turning plate 338 comes into contact with stopper plate 329. Tone arm 322 is stopped at this position, that is, tone arm 322 is above the outside non-recorded groove on the record. On the other hand, moving plate 335 is turning continuously, hair spring 382 of moving plate 335 contacts hook 339*c* of holding arm 339 and rotates holding arm 339. Holding arm 339 is stopped in its rotation by stopper 338*b* and tone arm 322 becomes free. Elevation pin 378 is shifted from the higher cam portion 335*a* to lower cam portion 335*b*. Pick-up 324 of tone arm 322 is slowly comes down on the record and the record is reproduced.

When the record is reproduced again, sub-motor 327 begins to operate again and moving plate 335 is returned. Tone arm 322 is lifted up from the record and is returned onto the arm rest by returning arm 336. Turning plate 338 is returned with moving plate 335 and comes into contact with stopper 344 before moving plate 335 is returned. Holding arm 339 is turned to the left by hair spring 382 of moving plate 335. Thus, this mechanism returns the recorder to the OFF state.

When tone arm 322 is operated manually, notch 342*d* of stopper plate 342 is clutched by leaf spring 343. Thus, stopping plate 342 is nearly in contact with turning plate 338.

When sub-motor 327 begins to operate, moving plate 335 is turned to right, but turning plate 338 is stopped by stopping plate 342. After sub-motor 327 turns to an angle of 180°, tone arm 322 can be freely operated manually.

When tone arm 322 is operated manually before sub-motor 327 begins to operate, returning arm 336 is turned counterclockwise by spindle 357 which cooperates with tone arm 322; therefore tone arm 322 is no longer prevented from returning arm 336 in its operation and returning arm 336 is maintained to meet the right side of cut portion 335 *c*. However, arm portion 339*b* of holding arm 339 then comes into contact with stopper 338*b*. As sub-motor 327 begin to operate, holding arm 339 on turning plate 338 is turned to the right by hair spring 382 and returning arm 336 is returned to the left. The elevation pin 378 is shifted from the higher cam portion 335*a* to the lower cam portion 335*b*, and pick-up 324 slowly comes down on the record. Now, the reproduction of the record can start.

When the record is reproduced completely or is stopped halfway, tone arm 322 is returned onto the arm rest 325 with the above-mentioned operation.

What is claimed is:

1. In an automatic record player of the type including a rotatable turntable having a platform, a tone arm supporting a pick up means, and an arm rest, the combination comprising:

a. a tone arm shaft pivotably mounting said tone arm for movement of said tone arm in a vertical direction, said shaft in turn being mounted adjacent said tone arm and pivotable about a vertical axis to allow said tone arm to rotate about said vertical axis, b. a fixed arm having a screw on its end and fixed to the other end of said tone arm shaft, c. a free arm having a slope portion and a spindle on its end freely pivoted near the other end of said tone arm shaft, said screw on said fixed arm being always maintained in contact with said slope of said free arm by means of a spring and for changing a relative angle of said fixed arm and said free arm for adjusting said tone arm to lower correctly onto an outside non-recorded groove of a record, d. a reciprocal driving means, e. a moving plate having a high cam portion and a low cam portion connected with said driving means and moved reciprocatively, f. a turning plate having a holding arm which is turned to the right or left by a spring, said turning plate and said holding arm holding said spindle of said free arm to move said tone arm onto a record, g. a return plate pivoted on said moving plate and turnable to the right or left, said return plate contacting with said spindle of said free arm for returning said tone arm from a record onto said arm rest, h. a compression spring interposed between said moving plate and said turning plate for transmitting the force of said reciprocal driving means from said moving plate to said turning plate, i. stopping means for limiting the turn of said turning plate to move said tone arm to an outside non-recorded groove of a record, including a stopping plate with notches, j. supporting means moved by said high cam portion and said low cam portion of said moving plate for respectively lifting up and lowering said tone arm, and k. sensing means for perceiving the end of the reproduction of a record and thereafter activating said driving means.

2. An automatic record player as in claim 1, where the sensing means includes a sub-motor, a switch means and a sensing lever, the sensing lever pivoted on the tone arm shaft for perceiving the end of the reproduction of a record and for operating the sub-motor through the switch means.

3. In an automatic record player of the type including a rotatable turntable having a platform, a tone arm supporting a pick up means and an arm rest, the embodiment comprising:

a. a tone arm shaft pivotably mounting said tone arm for movement of said tone arm in a vertical direction, said shaft in turn being mounted adjacent said tone arm and pivotable about a vertical axis to allow said tone arm to rotate about said vertical axis, b. a turning plate means for turning said tone arm from said arm rest to a record, c. a fixed arm having a screw on its end and fixed on the other end of said tone arm shaft, d. a spring means, e. a free arm having a slope portion and a spindle on its free end freely pivoted near the other end of said tone arm shaft, said screw on said fixed arm being always maintained in contact with said slope of said free arm by means of said spring means and for changing the relative angle of said fixed arm and said free arm for adjusting said tone arm to lower correctly onto an outside non-recorded groove of a record, f. a sub-motor for moving said tone arm and having a rotating plate on its shaft, g. a moving plate having a higher cam portion and a lower cam portion connected with said rotating plate and moved reciprocatively, said turning plate means further having a spring and a holding arm which is turned to the right or left by said spring, said turning plate and said holding arm holding said spindle of said free arm in order to move said tone arm onto a record, h. a returning plate pivoted on said moving plate and turned to the right or left, said returning plate contacting said spindle of said free arm for returning said tone arm from a record onto said arm rest, i. a compression spring interposed between said moving plate and said turning plate for transmitting the force of said control driving means from said moving plate to said turning plate, j. fine adjustment means for placing said tone arm on an outside non-recorded groove of a record when said tone arm is turned, said fine adjustment means connected with the other end of said tone arm shaft which extends below said platform and for coupling said turning device when said tone arm is turned from said arm rest to a record and for coupling said returning plate means when said tone arm is returned from said record to said arm rest, k. stopping means for limiting the turn of said turning plate means to move said tone arm to an outside non-recorded groove of a record, l. supporting means moved by said higher cam portion and said lower cam portion of said moving plate for lifting up and lowering said tone arm, m. switching means for operating said sub-motor, and n. a sensing lever pivoted freely on said shaft for perceiving the end of the reproduction of a record and for operating said switch means.

4. In an automatic record player of the type having a rotatable turntable on a platform, a tone arm supporting a pick up means and an arm rest, the combination comprising:

a. a tone arm shaft pivotably mounting said tone arm for movement of said tone arm in a vertical direction, said shaft in turn being mounted adjacent said tone arm and pivotable about a vertical axis to allow said tone arm to rotate about said vertical axis, b. a turning device for turning said tone arm from said arm rest to a record, c. a moving plate which has a higher cam portion and a lower cam portion connected to a driving means and moved reciprocatively therewith, d. a returning means, including a spring pivoted on said moving plate, for returning said tone arm from a record onto said arm rest, e. connecting means fixed on the other end of said tone arm shaft extending below said platform for coupling said tone arm shaft with said turning device when said tone arm is turned from said arm rest to a record and for coupling to said returning means when said tone arm is returned from said record to said arm rest, f. a compression spring interposed between said moving plate and said turning device for transmitting the force of said driving means from said moving plate to said turning device, g. stopping means for limiting the turn of said turning device to move said tone arm to an outside non-recorded groove of a record, including an arm with notches and a spring bias stopper, h. supporting mean moved by said higher cam portion and said lower cam portion of said moving plate for respectively lifting up and lowering said tone arm, and i. sensing means for perceiving the end of the reproduction of a record and thereafter activating said driving means.

5. In an automatic record player of the type having a rotatable turntable on a platform, a tone arm supporting a pick up means, and an arm rest, the combination comprising:

a. a tone arm shaft pivotably mounting said tone arm for movement of said tone arm in a vertical direction, said shaft in turn being mounted adjacent said tone arm and pivotable about a vertical axis to allow said tone arm to rotate about said vertical axis, b. a turning device having a holding arm which is turned to the right or left by a spring, c. a reciprocal driving means, d. a moving plate having a higher cam portion and a lower cam portion connected to said driving means and moved reciprocatively therewith, e. a spring, f. a returning plate pivoted on said moving plate and turned to the right or left, g. fine adjustment means for placing said tone arm on an outside non-recorded groove of a record when said tone arm is turned, said fine adjustment means connected with the other end of said tone arm shaft which extends below said platform and for coupling said turning device when said tone arm is turned from said arm rest to a record and for coupling said returning plate when said tone arm is returned from said second to said arm rest, h. a compression spring interposed between said moving plate and said turning plate for transmitting the force of said driving means from said moving plate to said turning device, i. stopping means for limiting the turn of said turning device to move said tone arm to an outside non-recorded groove of a record, j. supporting means moved by said higher cam portion and said lower cam portion of said moving plate for respectively lifting up and lowering said tone arm, and k. sensing means for perceiving the end of the reproduction of a record and thereafter activating said driving means.

6. In an automatic record player of the type including a rotatable turntable having a platform, a tone arm supporting a pick up means, and an arm rest, the combination comprising:

a. a tone arm shaft pivotably mounting said tone arm for movement of said tone arm in a vertical direction, said shaft in turn being mounted adjacent said tone arm and pivotable about a vertical axis to allow said tone arm to rotate about said vertical axis, b. a fixed arm having a screw on its end and fixed on the other end of said tone arm shaft, c. a spring, d. a free arm which has a slope portion and a spindle on its end freely pivoted near the other end of said tone arm shaft, said screw on said fixed arm being always maintained in contact with said slope of said free arm by means of said spring and for changing the relative angle of said fixed arm and said free arm for adjusting said tone arm to come down correctly on an outside non-recorded groove of a record, e. a reciprocal driving means, f. a moving plate having a higher cam portion and a lower cam portion connected with said driving means and moved reciprocatively, g. a turning plate having a holding arm which is turned to the right or left, said turning plate and said holding arm holding said spindle of said free arm to move said tone arm onto a record, h. a returning plate pivoted on said moving plate and turnable to the right or left by a spring, said returning plate contacting with said spindle of said free arm for returning said tone arm from a record onto said arm rest, i. a compression spring interposed between said moving plate and said turning plate for transmitting the force of said driving means from said moving plate to said turning plate, j. stopping means for limiting the turn of said turning device to move said tone arm to an outside non-recorded groove of a record,
k. supporting means moved by said higher cam portion and said lower cam portion of said moving plate for respectively lifting up and lowering said tone arm, and
l. sensing means for perceiving the end of the reproduction of a record and thereafter activating said driving means.

7. In an automatic record player of the type including a rotatable turntable having a platform, a tone arm supporting a pick up means and an arm rest, the embodiment comprising:

a. a tone arm shaft pivotably mounting said tone arm for movement of said tone arm in a vertical direction, said shaft in turn being mounted adjacent said tone arm and pivotable about a vertical axis to allow said tone arm to rotate about said vertical axis,
b. a fixed arm having a screw on its end and fixed on the other end of said tone arm shaft,
c. a free arm which has a slope portion and a spindle on its end freely pivoted near the other end of said tone arm shaft, said screw on said fixed arm being always maintained in contact with said slope of said free arm by means of a spring and for changing the relative angle of said fixed arm and said free arm for adjusting said tone arm to lower correctly onto an outside non-recorded groove of a record,
d. a sub-motor for moving said tone arm and having a rotating plate on its shaft,
e. a moving plate having a higher cam portion and a lower cam portion connected with said rotating plate and moved reciprocatively,
f. a turning plate having a holding arm which is turned to the right or left, said turning plate and said holding arm holding said spindle of said free arm in order to move said tone arm correctly onto a record,
g. a returning plate pivoted on said moving plate and turned to the right or left by a spring, said returning plate contacting said spindle of said free arm for returning said tone arm from a record onto said arm rest,
h. a compression spring interposed between said moving plate and said turning plate for transmitting the force of said sub-motor from said moving plate to said turning plate,
i. stopping means for limiting the turn of said turning device to move said tone arm to an outside non-recorded groove of a record,
j. supporting means moved by said higher cam portion and said lower cam portion of said moving plate for lifting up and lowering said tone arm,
k. switching means for operating said sub-motor,
l. an operating lever pivoted on a shaft and turned by said fixed arm, and
m. a sensing lever pivoted freely on said shaft for perceiving the end of the reproduction of a record and for operating said switch means through said operating lever.

* * * * *